(12) United States Patent
Shindo

(10) Patent No.: US 7,964,070 B2
(45) Date of Patent: *Jun. 21, 2011

(54) HIGHLY PURE HAFNIUM MATERIAL, TARGET THIN FILM COMPRISING THE SAME AND METHOD FOR PRODUCING HIGHLY PURE HAFNIUM

(75) Inventor: Yuichiro Shindo, Ibaraki (JP)

(73) Assignee: JX Nippon Mining & Metals Corporation, Tokyo (JP)

(*) Notice: Subject to any disclaimer, the term of this patent is extended or adjusted under 35 U.S.C. 154(b) by 88 days.

This patent is subject to a terminal disclaimer.

(21) Appl. No.: 10/565,767

(22) PCT Filed: Apr. 15, 2004

(86) PCT No.: PCT/JP2004/005389
§ 371 (c)(1), (2), (4) Date: Jan. 24, 2006

(87) PCT Pub. No.: WO2005/010220
PCT Pub. Date: Feb. 3, 2005

(65) Prior Publication Data
US 2007/0018138 A1    Jan. 25, 2007

(30) Foreign Application Priority Data
Jul. 25, 2003    (JP) .................... 2003-279695

(51) Int. Cl.
C22C 27/00    (2006.01)
C23C 14/34    (2006.01)
(52) U.S. Cl. .................. 204/298.13; 148/421
(58) Field of Classification Search ............ 75/611–621; 148/407, 421, 668; 204/298.12, 298.13; 420/422
See application file for complete search history.

(56) References Cited

U.S. PATENT DOCUMENTS

| | | | |
|---|---|---|---|
| 2,782,116 A | 2/1957 | Spedding et al. | |
| 4,637,831 A | 1/1987 | Stoltz et al. | |
| 4,668,287 A | 5/1987 | Kwon | |
| 4,897,116 A | 1/1990 | Scheel | |
| 5,112,493 A | 5/1992 | Snyder et al. | |
| 5,196,916 A | 3/1993 | Ishigami et al. | |
| 5,458,697 A | 10/1995 | Ishigami et al. | |
| 5,460,793 A | 10/1995 | Kano et al. | |
| 5,679,983 A | 10/1997 | Ishigami et al. | |
| 6,352,628 B2* | 3/2002 | Sato et al. ............ | 204/298.13 |
| 6,723,183 B2 | 4/2004 | Oda et al. | |
| 6,737,030 B2 | 5/2004 | Sommers et al. | |
| 6,861,030 B2 | 3/2005 | Shindo | |
| 6,986,834 B2 | 1/2006 | Irumata et al. | |
| 7,241,368 B2 | 7/2007 | Irumata et al. | |
| 7,674,441 B2 | 3/2010 | Shindo | |
| 2002/0194953 A1* | 12/2002 | Rosenberg et al. ...... | 75/10.18 |
| 2003/0052000 A1* | 3/2003 | Segal et al. ............ | 204/298.13 |
| 2003/0062261 A1* | 4/2003 | Shindo | |
| 2004/0170552 A1 | 9/2004 | Irumata et al. | |
| 2006/0062910 A1 | 3/2006 | Meiere | |
| 2006/0189164 A1 | 8/2006 | Okabe et al. | |
| 2006/0193979 A1 | 8/2006 | Meiere et al. | |
| 2006/0266158 A1 | 11/2006 | Shindo | |
| 2009/0000704 A1 | 1/2009 | Okabe et al. | |
| 2009/0126529 A1 | 5/2009 | Shindo | |
| 2009/0226341 A1 | 9/2009 | Shindo | |

FOREIGN PATENT DOCUMENTS

| | | |
|---|---|---|
| EP | 0134643 A2 | 3/1985 |
| EP | 0154448 A2 | 9/1985 |
| JP | 07-316681 A | 12/1995 |

OTHER PUBLICATIONS

G T Murray and T.A. Lograsso, Preparation and Characterization of Pure Metals, ASM Handbook, vol. 2, (1995), p. 1093-1097) in view of Shindo (US 2003/0062261 A1.*
Esp@cenet database, One Page English Abstract of JP 10-204554, Aug. 4, 1998.
R.F. Rolsten, "Iodide Metals and Metal Iodides", John Wiley & Sons, Inc., pp. 74-77, 1961.
R.H. Nielson, "Hafnium and Hafnium Compounds", Ullmann's Encyclopedia of Industrial Chemistry, Wiley-VCH Verlag GmbH & Co., pp. 1-12, Jun. 15, 2000.

* cited by examiner

Primary Examiner — George Wyszomierski
Assistant Examiner — Mark L Shevin
(74) Attorney, Agent, or Firm — Howson & Howson LLP

(57) ABSTRACT

Provided is a manufacturing method of high purity hafnium including the steps of making aqueous solution of chloride of hafnium, thereafter removing zirconium therefrom via solvent extraction, performing neutralization treatment to obtain hafnium oxide, further performing chlorination to obtain hafnium chloride, obtaining hafnium sponge via reducing said hafnium chloride, and performing electron beam melting to the hafnium sponge in order to obtain a hafnium ingot, as well as a high purity hafnium material obtained thereby and a target and thin film formed from such material. The present invention relates to a high purity hafnium material with reduced zirconium content contained in the hafnium, a target and thin film formed from such material, and the manufacturing method thereof, and provides efficient and stable manufacturing technology, a high purity hafnium material obtained according to such manufacturing technology, and a target and high purity hafnium thin film formed from such material.

8 Claims, No Drawings

HIGHLY PURE HAFNIUM MATERIAL, TARGET THIN FILM COMPRISING THE SAME AND METHOD FOR PRODUCING HIGHLY PURE HAFNIUM

BACKGROUND OF THE INVENTION

The present invention relates to a high purity hafnium material with a reduced zirconium content contained in the hafnium, a target and thin film formed from this material, and a manufacturing method of high purity hafnium.

Conventionally, there are numerous documents relating to the manufacture of hafnium, and, since hafnium and zirconium are very similar in terms of atomic structure and chemical property, the inclusion of zirconium or the inclusion of zirconium in hafnium was never really acknowledged as a problem as exemplified below.

Hafnium and zirconium are superior in heat resistance and corrosion resistance, and are characterized in that they have a strong affinity with oxygen and nitrogen. And, since the oxides or nitrides thereof have superior stability in high temperatures, they are utilized as ceramics in the atomic power generation or as fire-resistant materials in the manufacture of steel or castings. Further, recently, these are also being used as electronic materials or optical materials.

The manufacturing method of metal hafnium or metal zirconium is proposed as the same manufacturing method. As such example, there is a method of reacting a fluorine-containing zirconium or hafnium compound with metal aluminum or magnesium in inert gas, reducing gas or vacuum at a temperature of 400° C. or higher (e.g., refer to Japanese Patent Laid-Open Publication No. S60-17027); a manufacturing method of reducing zirconium chloride, hafnium chloride or titanium chloride to obtain the respective metals thereof characterized in the sealing metal (e.g., refer to Japanese Patent Laid-Open Publication No. S61-279641); a manufacturing method of hafnium or zirconium characterized in the reaction container structure upon reducing zirconium tetrachloride or hafnium tetrachloride with magnesium and the manufacturing technique thereof (e.g., refer to Japanese Patent Laid-Open Publication No. S62-103328); a method of manufacturing chloric-, bromic- or iodic-zirconium, hafnium, tantalum, vanadium or niobium compound vapor by introducing these into a crucible (e.g., refer to PC(WO)1991-501630); a method of refining zirconium or hafnium-chloride or an acid chloride aqueous solution with strongly basic anion exchange resin (e.g., refer to Japanese Patent Laid-Open Publication No. H10-204554); and a method of collecting zirconium via solvent extraction (e.g., refer to Japanese Patent Laid-Open Publication No. S60-255621).

As described in the foregoing documents, although there are numerous refining methods and extraction methods of zirconium and hafnium, the inclusion of zirconium or the inclusion of zirconium in hafnium was never really acknowledged as a problem.

Nevertheless, in recent years, deposition on electronic components using hafnium silicide is being demanded. In such a case, even zirconium is an impurity, and there is a possibility that the required characteristics of the hafnium raw material may become unstable. Therefore, there is demand for a high purity hafnium material with reduced zirconium, and a target and thin film formed from such a material.

However, since there was no notion of separating hafnium from zirconium as described above, the actual condition is that there is no efficient and stable manufacturing technology for obtaining the foregoing high purity hafnium material with reduced zirconium, and a target and thin film formed from such a material.

SUMMARY OF THE INVENTION

Thus, the present invention relates to a high purity hafnium material with a reduced zirconium content contained in the hafnium, a target and thin film formed from this material, and a manufacturing method of high purity hafnium, and an object thereof is to provide efficient and stable manufacturing technology, a high purity hafnium material obtained according to such manufacturing technology, and a target and thin film formed from such material.

In order to achieve the foregoing object, as a result of intense study, the present inventors discovered that high purity hafnium can be manufactured by separating zirconium via solvent extraction, and performing electron beam melting thereto.

Based on the foregoing discovery, the present invention provides:

1. A high purity hafnium material, and a target and thin film formed from this material, wherein the zirconium content is 1 to 1000 wtppm, and the purity thereof is 4N to 6N excluding gas components such as carbon, oxygen and nitrogen;
2. The high purity hafnium material, and the target and thin film formed from this material according to paragraph 1 above, wherein oxygen is 500 wtppm or less, nitrogen and carbon are respectively 100 wtppm or less, iron, chromium and nickel are respectively 10 wtppm or less, and the purity thereof is 4N to 6N excluding gas components such as carbon, oxygen and nitrogen;
3. A manufacturing method of high purity hafnium including the steps of making aqueous solution of chloride of hafnium, thereafter removing zirconium therefrom via solvent extraction, performing neutralization treatment to obtain hafniutn oxide, further performing chlorination to obtain hafnium chloride, and reducing this to obtain a hafnium sponge;
4. The manufacturing method of high purity hafnium according to paragraph 3 above, wherein the moisture content in the hafnium chloride before reduction and in the atmosphere is 0.1 wt % or less, and the nitrogen content therein is 0.1 wt % or less;
5. The manufacturing method of high purity hafnium according to paragraph 3 or paragraph 4 above, wherein the reduction atmosphere is argon atmosphere, and reduction is performed under a positive pressure of 1 atmospheric pressure or greater;
6. The manufacturing method of high purity hafnium according to any one of paragraphs 3 to 5 above, wherein electron beam melting is further performed to the hafnium sponge in order to obtain a hafnium ingot;
7. The manufacturing method of high purity hafnium according to any one of paragraphs 3 to 6 above, wherein hafnium chloride is reduced with metal having stronger chloridization power than hafnium;
8. The manufacturing method of high purity hafnium according to any one of paragraphs 3 to 7 above, wherein the zirconium content is 1 to 1000 wtppm, and the purity thereof is 4N to 6N excluding gas components such as carbon, oxygen and nitrogen; and
9. The manufacturing method of high purity hafnium according to paragraph 8 above, wherein oxygen is 100 wtppm or less, nitrogen and carbon are respectively 30 wtppm or less, iron, chromium and nickel are respectively 5 wtppm or less, and the purity thereof is 4N to 6N excluding gas components such as carbon, oxygen and nitrogen.

The present invention yields a superior effect in that high purity hafnium can be stably manufactured by removing zirconium from the hafnium chloride aqueous solution via solvent extraction, reducing this to obtain a hafnium sponge, thereafter performing electron beam melting to this hafnium sponge, and thereby efficiently removing zirconium.

Further, the present invention yields an effect in that a high purity hafnium thin film can be obtained by manufacturing a sputtering target from the high purity hafnium ingot obtained with the foregoing process, and using this target to perform sputtering.

DETAILED DESCRIPTION OF THE INVENTION

In the present invention, the starting raw material will be zirconium tetrachloride ($HfCl_4$). A commercially available material can be used as the zirconium tetrachloride. This commercially available zirconium tetrachloride contains roughly 5 wt % of zirconium.

This hafnium raw material, excluding zirconium, has a purity level of 3N, and contains, as main impurities other than zirconium, roughly 500 wtppm, 40 wtppm and 1000 wtppm of iron, chromium and nickel, respectively.

First, this zirconium tetrachloride raw material is dissolved in purified water. Next, this is subject to multistage organic solvent extraction. Normally, solvent extraction is performed in 1 to 10 stages. TBP may be used as the organic solvent. As a result, zirconium can be made to be 1000 wtppm or less, and normally 1 to 200 wtppm.

Next, neutralization treatment is performed to obtain hafnium oxide ($HfO_2$). This hafnium oxide is subject to chlorination to obtain high purity zirconium tetrachloride ($HfCl_4$), and this is further reduced with, for instance, magnesium metal having chloridization power that is stronger than hafnium or zirconium to obtain a hafnium sponge. As the reducing metal, in addition to magnesium, for instance, calcium, sodium, and so on may be used.

In order to efficiently perform the reduction treatment, it is desirable to make the moisture content in the hafnium chloride before reduction and in the atmosphere 0.1 wt % or less, and the nitrogen content therein 0.1 wt % or less. Further, when argon atmosphere is the reduction atmosphere, it is desirable to perform the reduction under a positive pressure of 1 atmospheric pressure or greater.

The obtained hafnium sponge may be further subject to electron beam melting for removing volatile elements, gas components and so on in order to increase the purity thereof.

According to the foregoing process, obtained is a high purity hafnium ingot wherein zirconium is 1 to 1000 wtppm and having a purity of 4N (99.99 wt %) or more excluding gas components such as carbon, oxygen and nitrogen; a high purity hafnium material wherein zirconium is 1 to 1000 wtppm, oxygen is 100 wtppm or less, nitrogen and carbon are respectively 30 wtppm or less, iron, chrome and nickel are respectively 5 wtppm or less, and having a purity of 4N to 6N excluding gas components such as carbon, oxygen and nitrogen; and a target formed from such high purity hafnium material; and, by using this target to perform sputtering, the high purity hafnium material can be deposited on a substrate.

The target may be manufactured with the ordinary processing steps of forging, rolling, cutting, finishing (polishing) and so on. There is no particular limitation in the manufacturing method thereof, and the method may be selected arbitrarily.

According to the present manufacturing method, as described above, the zirconium content in the hafnium can be reduced down to 1 wtppm, and a total purity of 6N can be achieved.

EXAMPLES

The Examples are now explained. Incidentally, these Examples are merely illustrative, and the present invention shall in no way be limited thereby. In other words, the present invention shall only be limited by the scope of claim for a patent, and shall include the various modifications other than the Examples of this invention.

Example 1

The present invention used 100 g of commercially available zirconium tetrachloride ($HfCl_4$) having a purity of 3N and containing roughly 5000 wtppm of zirconium as the raw material, and this was dissolved in 1 L of purified water to obtain a nitric acid solution. This raw material contained 500 wtppm, 40 wtppm and 1000 wtppm of iron, chromium and nickel, respectively, as its main impurities.

Next, this hafnium raw material was subject to 4-stage organic solvent extraction using TBP organic solvent, and neutralization treatment was performed to obtain hafnium oxide ($HfO_2$).

Further, this hafnium oxide was subject to chlorination to obtain high purity zirconium tetrachloride ($HfCl_4$), and then subject to magnesium reduction to obtain a hafnium sponge. In order to efficiently perform the reduction treatment, the moisture content in the hafnium chloride before reduction and in the atmosphere was made to be 0.1 wt % or less, and the nitrogen content therein was made to be 0.1 wt % or less. Moreover, the atmosphere was made to be argon atmosphere, and reduction was performed under a positive pressure of 1.2 atmospheric pressure.

The obtained hafnium sponge was further subject to electron beam melting to remove volatile elements, gas components and so on. As a result of the foregoing process, it was possible to obtain a high purity hafnium ingot having a purity level of 4N5 (99.995 wt %) wherein zirconium is 80 wtppm; iron, chrome and nickel are respectively 1 wtppm, 0.2 wtppm and 2 wtppm; and oxygen, nitrogen and carbon are respectively 20 wtppm, 10 wtppm and 20 wtppm.

The sputtering target obtained from this ingot was able to maintain high purity, and it was possible to form a high purity hafnium thin film having uniform characteristics on a substrate by performing sputtering such sputtering target.

Example 2

The present invention used 100 g of commercially available zirconium tetrachloride ($HfCl_4$) having a purity of 2N5 and containing roughly 3500 wtppm of zirconium as the raw material, and this was dissolved in 1 L of purified water. This raw material contained 500 wtppm, 100 wtppm and 300 wtppm of iron, chromium and nickel, respectively, as its main impurities.

Next, this hafnium raw material was subject to 6-stage organic solvent extraction using TBP organic solvent, and neutralization treatment was performed to obtain hafnium oxide ($HfO_2$). Further, this hafnium oxide was subject to chlorination to obtain high purity zirconium tetrachloride ($HfCl_4$), and then subject to calcium reduction to obtain hafnium sponge.

In order to efficiently perform the reduction treatment, the moisture content in the hafnium chloride before reduction and in the atmosphere was made to be 0.1 wt % or less, and the nitrogen content therein was made to be 0.05 wt % or less. Moreover, the atmosphere was made to be argon atmosphere, and reduction was performed under a positive pressure of 2 atmospheric pressure.

The obtained hafnium sponge was further subject to electron beam melting to remove volatile elements, gas components and so on. As a result of the foregoing process, it was possible to obtain a high purity hafnium ingot having a purity level of 4N (99.99 wt %) wherein zirconium is 600 wtppm; iron, chrome and nickel are respectively 10 wtppm, 2 wtppm and 5 wtppm; and oxygen, nitrogen and carbon are respectively 100 wtppm, 30 wtppm and 30 wtppm.

The sputtering target obtained from this ingot was able to maintain high purity, and it was possible to form a high purity hafnium thin film having uniform characteristics on a substrate by performing sputtering such sputtering target.

Example 3

The present invention used 100 g of commercially available zirconium tetrachloride ($HfCl_4$) having a purity of 3N5 and containing roughly 1200 wtppm of zirconium as the raw material, and this was dissolved in 1 L of purified water. This raw material contained 500 wtppm, 100 wtppm and 300 wtppm of iron, chromium and nickel, respectively, as its main impurities.

Next, this hafnium raw material was subject to 20-stage organic solvent extraction using TBP organic solvent, and neutralization treatment was performed to obtain hafnium oxide ($HfO_2$). Further, this hafnium oxide was subject to chlorination to obtain high purity zirconium tetrachloride ($HfCl_4$), and then subject to sodium reduction to obtain hafnium sponge.

In order to efficiently perform the reduction treatment, the moisture content in the hafnium chloride before reduction and in the atmosphere was made to be 0.001 wt %, and the nitrogen content therein was made to be 0.0001 wt %. Moreover, the atmosphere was made to be argon atmosphere, and reduction was performed under a positive pressure of 1.5 atmospheric pressure.

The obtained hafnium sponge was further subject to electron beam melting to remove volatile elements, gas components and so on. As a result of the foregoing process, it was possible to obtain a high purity hafnium ingot having a purity level of 6N (99.9999 wt %) wherein zirconium is 5 wtppm; iron, chrome and nickel are respectively 0.2 wtppm, 0.01 wtppm and 0.1 wtppm; and oxygen, nitrogen and carbon are respectively 10 wtppm, <10 wtppm and <10 wtppm.

The sputtering target obtained from this ingot was able to maintain high purity, and it was possible to form a high purity hafnium thin film having uniform characteristics on a substrate by performing sputtering such sputtering target.

By removing zirconium from hafnium chloride aqueous solution of the present invention via solvent extraction, obtaining hafnium sponge via reducing said hafnium chloride, and thereafter performing electron beam melting to this hafnium sponge, zirconium can be efficiently removed, and extremely pure hafnium can be stably manufactured. Thus, such high purity hafnium can be used as a heat-resistant or corrosion-resistant material, or an electronic material or optical material.

The invention claimed is:

1. A sputtering target or thin film formed therefrom comprising a sputtering target or thin film made of a high purity hafnium material, wherein a zirconium content of the target or thin film is 1 to 1000 wtppm, a purity of the target or thin film is 4N5 to 6N excluding gas components of carbon, oxygen and nitrogen, and the contents of oxygen being 500 wtppm or less, nitrogen and carbon being respectively 100 wtppm or less, and iron, chromium and nickel being respectively 10 wtppm or less.

2. A sputtering target or thin film according to claim 1, wherein said purity of the target or thin film is 6N.

3. A hafnium sputtering target comprising:
   a sputtering target body consisting of high purity hafnium of a purity of at least 4N5 (99.995 wt %) excluding zirconium content and gas components of carbon, oxygen and nitrogen;
   said high purity hafnium having a zirconium content of 1 to 1000 wtppm, an oxygen content of 500 wtppm or less, a nitrogen content of 100 wtppm or less, a carbon content of 100 wtppm or less, an iron content of 10 wtppm or less, a chromium content of 10 wtppm or less, and a nickel content of 10 wtppm or less; and
   said sputtering target body having a forged and rolled microstructure having been subject to forging and rolling processing.

4. A hafnium sputtering target according to claim 3, wherein said purity is 6N (99.9999 wt %).

5. A hafnium sputtering target according to claim 3, wherein said zirconium content throughout said sputtering target body is 1 to 200 wtppm.

6. A thin film formed from sputtering a hafnium sputtering target comprising:
   a thin film consisting of high purity hafnium of a purity of at least 4N5 (99.995 wt %) excluding zirconium content and gas components of carbon, oxygen and nitrogen;
   said high purity hafnium having a zirconium content of 1 to 1000 wtppm, an oxygen content of 500 wtppm or less, a nitrogen content of 100 wtppm or less, a carbon content of 100 wtppm or less, an iron content of 10 wtppm or less, a chromium content of 10 wtppm or less, and a nickel content of 10 wtppm or less.

7. A thin film according to claim 6, wherein said purity is 6N (99.9999 wt %).

8. A thin film according to claim 7, wherein said zirconium content is 1 to 200 wtppm.

* * * * *